United States Patent
Madden et al.

(10) Patent No.: US 11,530,651 B2
(45) Date of Patent: Dec. 20, 2022

(54) STAGED COMBUSTION

(71) Applicant: ROLLS-ROYCE plc, London (GB)

(72) Inventors: Christopher P. Madden, Derby (GB); Peter Swann, Derby (GB)

(73) Assignee: Rolls-Royce PLC, London (GB)

( * ) Notice: Subject to any disclaimer, the term of this patent is extended or adjusted under 35 U.S.C. 154(b) by 0 days.

(21) Appl. No.: 17/189,650

(22) Filed: Mar. 2, 2021

(65) Prior Publication Data
US 2021/0277835 A1    Sep. 9, 2021

(30) Foreign Application Priority Data

Mar. 4, 2020   (GB) ................................ 2003094
Mar. 4, 2020   (GB) ................................ 2003095

(51) Int. Cl.
| | |
|---|---|
| *F02C 9/28* | (2006.01) |
| *F23R 3/34* | (2006.01) |
| *F02C 9/26* | (2006.01) |
| *F02C 9/40* | (2006.01) |
| *F02C 3/30* | (2006.01) |

(52) U.S. Cl.
CPC ............... *F02C 9/28* (2013.01); *F23R 3/346* (2013.01); *F02C 3/30* (2013.01); *F02C 9/263* (2013.01); *F02C 9/40* (2013.01); *F05D 2270/08* (2013.01); *F05D 2270/804* (2013.01)

(58) Field of Classification Search
CPC ...... F23R 3/346; F23R 3/343; F05D 2270/08; F05D 2270/804
See application file for complete search history.

(56) References Cited

U.S. PATENT DOCUMENTS

| | | | |
|---|---|---|---|
| 7,971,438 B2 | 7/2011 | Taylor et al. | |
| 2003/0217553 A1 | 11/2003 | Gadde et al. | |
| 2003/0217554 A1 | 11/2003 | Gadde et al. | |
| 2010/0043443 A1* | 2/2010 | Noppel | F02K 1/52 |
| | | | 60/39.5 |
| 2010/0287943 A1 | 11/2010 | McMahan et al. | |

(Continued)

FOREIGN PATENT DOCUMENTS

| | | |
|---|---|---|
| EP | 2677138 A2 | 12/2013 |
| EP | 2860375 A1 | 4/2015 |

(Continued)

OTHER PUBLICATIONS

European search report dated Jul. 5, 2021, issued in EP Patent Application No. 21155908.

(Continued)

*Primary Examiner* — Katheryn A Malatek

(57) ABSTRACT

A gas turbine engine for an aircraft. The gas turbine comprises a staged combustion system having pilot injectors and main injectors, a fuel metering system configured to control fuel flow to the pilot injectors and the main injectors, and a fuel system controller. The controller is configured to identify an atmospheric condition, determine a ratio of pilot fuel flow rate for the pilot injectors to main fuel flow rate for the main injectors in response to the atmospheric condition, and inject fuel by the pilot injectors and the main injectors in accordance with said ratio to control an index of soot emissions caused by combustion of fuel therein.

15 Claims, 10 Drawing Sheets

(56) References Cited

U.S. PATENT DOCUMENTS

| | | | |
|---|---|---|---|
| 2012/0022728 A1* | 1/2012 | Hall | B60L 50/61 |
| | | | 701/19 |
| 2013/0343958 A1* | 12/2013 | Swann | F02C 9/28 |
| | | | 422/111 |
| 2015/0100219 A1* | 4/2015 | Swann | F02C 7/22 |
| | | | 701/100 |
| 2015/0345791 A1* | 12/2015 | Whiteman | F23R 3/346 |
| | | | 60/734 |

FOREIGN PATENT DOCUMENTS

| | | |
|---|---|---|
| EP | 3301361 A1 | 4/2018 |
| GB | 2524775 B | 10/2015 |
| GB | 2534559 A | 8/2016 |

OTHER PUBLICATIONS

European search report dated Jun. 29, 2021, issued in EP Patent Application No. 21155907.
Great Britain search report dated Aug. 19, 2020, issued in GB Patent Application No. 2003094.6.
Great Britain search report dated May 22, 2020, issued in GB Patent Application No. 2003095.3.
Karcher et al, The microphysical pathway to contrail formation, Aug. 13, 2015.
Karcher & Yu, Role of aircraft soot emissions in contrail formation, Jan. 7, 2009.

* cited by examiner

STAGED COMBUSTION

CROSS REFERENCE TO RELATED APPLICATIONS

This application claims priority from United Kingdom Patent Application Numbers 2003094.6 and 2003095.3, both filed Mar. 4, 2020, the whole contents of which are incorporated herein by reference in their entirety.

BACKGROUND

Technical Field

This disclosure concerns aircraft gas turbine engines with staged combustion systems, and methods of operation thereof.

Description of the Related Art

Combustion of hydrocarbon fuels in aero engine combustion systems produces a hot exhaust stream composed primarily of nitrogen, oxygen, carbon dioxide and water vapour. In addition to these major components, a quantity of soot is also produced in locally-rich flame zones, along with thermal nitrogen oxides and sulphur oxides. Unburnt hydrocarbons and carbon monoxide may also be emitted in very low concentrations, together with trace quantities of other particulates.

The emission of a warm, moist exhaust plume into the cold ambient air found at typical flight levels can, under certain circumstances, result in the formation of condensation trails (also known as vapour trails or, as used hereinafter, by the contraction contrails). Application of the well-established Schmidt-Appleman criterion is indicative of whether a contrail can form, and in essence requires that the ambient temperature is below a threshold temperature. This threshold temperature is a function of ambient relative humidity over water and the gradient of a line representing the mixing process from the exhaust plume to ambient conditions in terms of water vapour partial pressure and temperature.

Microphysical analysis indicates that, for current fuel compositions and combustion technologies, the mechanisms of ice crystal formation depend principally upon emissions of soot. Initially-dry soot particles become activated by adsorption of oxidised sulphur, leading to scavenging of water molecules when relative humidity over water is in excess of 100 percent. Following this, immersion freezing occurs, producing an ice nucleus. Further depositional growth of the ice crystals may then proceed, in dependence upon the amount of water vapour, initially in the exhaust plume and subsequently in ambient air.

If ambient air is not supersaturated with respect to ice, then as the plume continues to mix out, ice mass is lost via sublimation and the contrail disappears. However, if ambient air is supersaturated with respect to ice, then the contrail may continue to exist for a substantial period of time and is termed a persistent contrail. These initially-linear contrails eventually spread out to form cirrus, and together are known as aviation-induced cloudiness.

Some modern aero engine combustors inject fuel in such a way that the fuel-air ratio is predominantly lean; thus there are substantially no rich zones in the flame and thus little or no soot forms. Whilst this may appear to solve the issue of contrail formation—contrails are seen by many as having an undesirable effect in terms of global heating—it does not take into account the desirable impact that contrails can have on the planet's albedo.

SUMMARY

The present disclosure is directed to staged combustion systems for aircraft gas turbine engines, and methods of operation thereof.

One such gas turbine engine, which may be for an aircraft installation, comprises:
a staged combustion system having pilot injectors and main injectors;
a fuel metering system configured to control fuel flow to the pilot injectors and the main injectors;
a fuel system controller configured to: identify an atmospheric condition; determine a ratio of pilot fuel flow rate for the pilot injectors to main fuel flow rate for the main injectors in response to the atmospheric condition; and inject fuel by the pilot injectors and the main injectors in accordance with said ratio to control an index of soot emissions caused by combustion of fuel therein.

One such method comprises:
providing pilot injectors for rich combustion and main injectors for lean combustion in said staged combustion system;
identifying an atmospheric condition;
determining a ratio of pilot fuel flow rate for the pilot injectors to main fuel flow rate for the main injectors in response to the atmospheric condition;
injecting fuel by the pilot injectors and the main injectors in accordance with said ratio to control an index of soot emissions caused by combustion of fuel therein.

DESCRIPTION OF THE DRAWINGS

Embodiments will now be described by way of example only with reference to the accompanying drawings, in which.

DETAILED DESCRIPTION

FIG. 1

Figure 1:
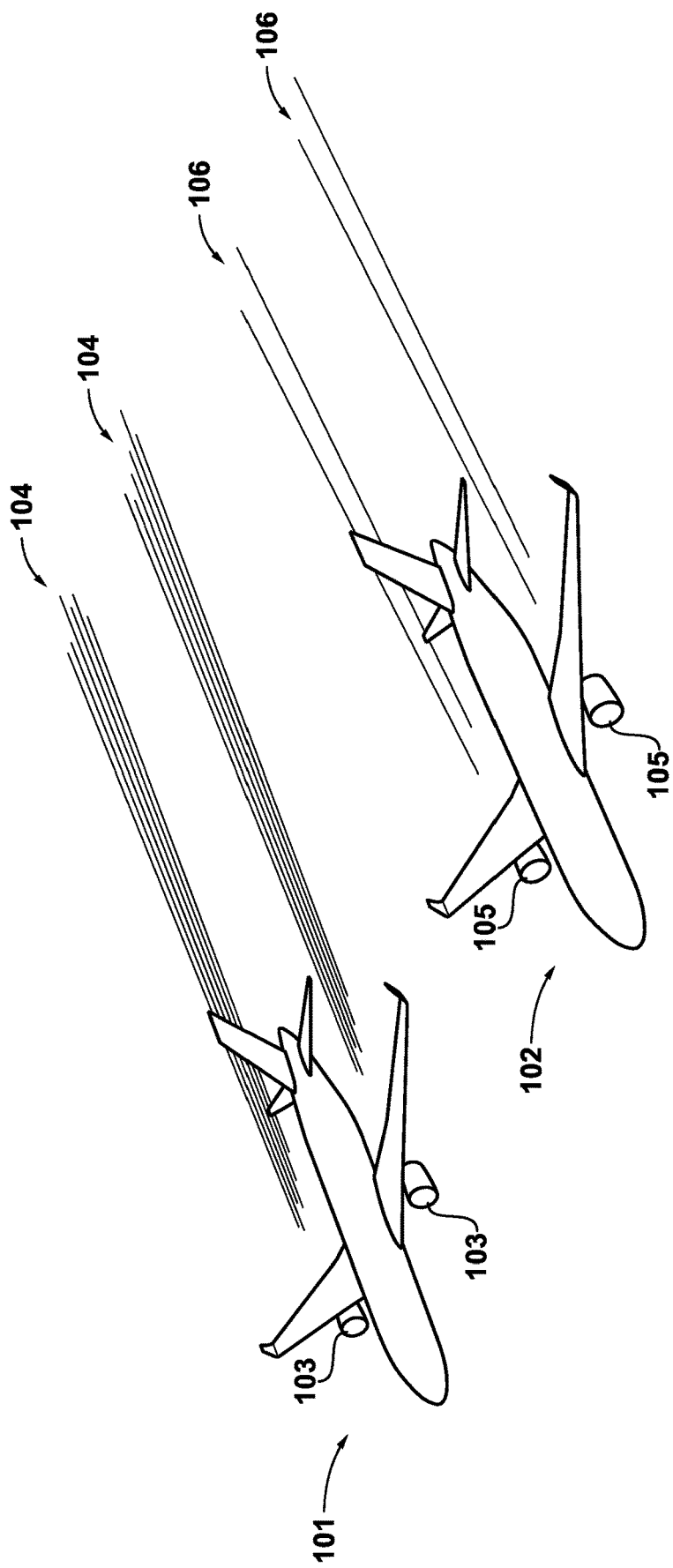
FIG. 1 shows two aircraft in flight, one of which has a pair of engines configured as set out above.

Two aircraft 101 and 102 are illustrated in FIG. 1 in formation at substantially the same flight level and in substantially the same atmospheric conditions.

The aircraft 101 and 102 are of substantially the same configuration, save for their engines. Aircraft 101 comprises two engines 103 which, due to their configuration and operating point, are forming contrails 104. Aircraft 102 comprises two engines 105 which are configured in accordance with the present disclosure, and are thus forming contrails 106 having a lower optical depth than contrails 104. As will be described herein, the engines 105 include functionality so as to allow the optical depth of any contrails they produce to be modified.

As used herein, optical depth is a measure of how much electromagnetic radiation, optionally in certain wavelength ranges, is prevented from travelling through a region. In the case of a contrail or ice cloud, optical depth is influenced primarily by the ice particle number density, effective ice particle radius, and the physical thickness of the cloud. Since most contrails are optically thin their radiative forcing is approximately proportional to their optical depth.

Thus, in the example of FIG. 1, a determination has been made to the effect that, in terms of climate impact, it would be preferable for any contrails produced to have a lower optical depth. In turn, therefore measures are taken within the engines 105 to reduce the optical depth of the contrails 106, so as to reduce the radiative forcing they cause.

As will also be described in further detail herein, the functionality of engines 105 is such that they may respond to the converse determination, i.e. that in terms of climate impact it would be preferable for any contrails produced to have a higher optical depth.

FIG. 2

Figure 2:
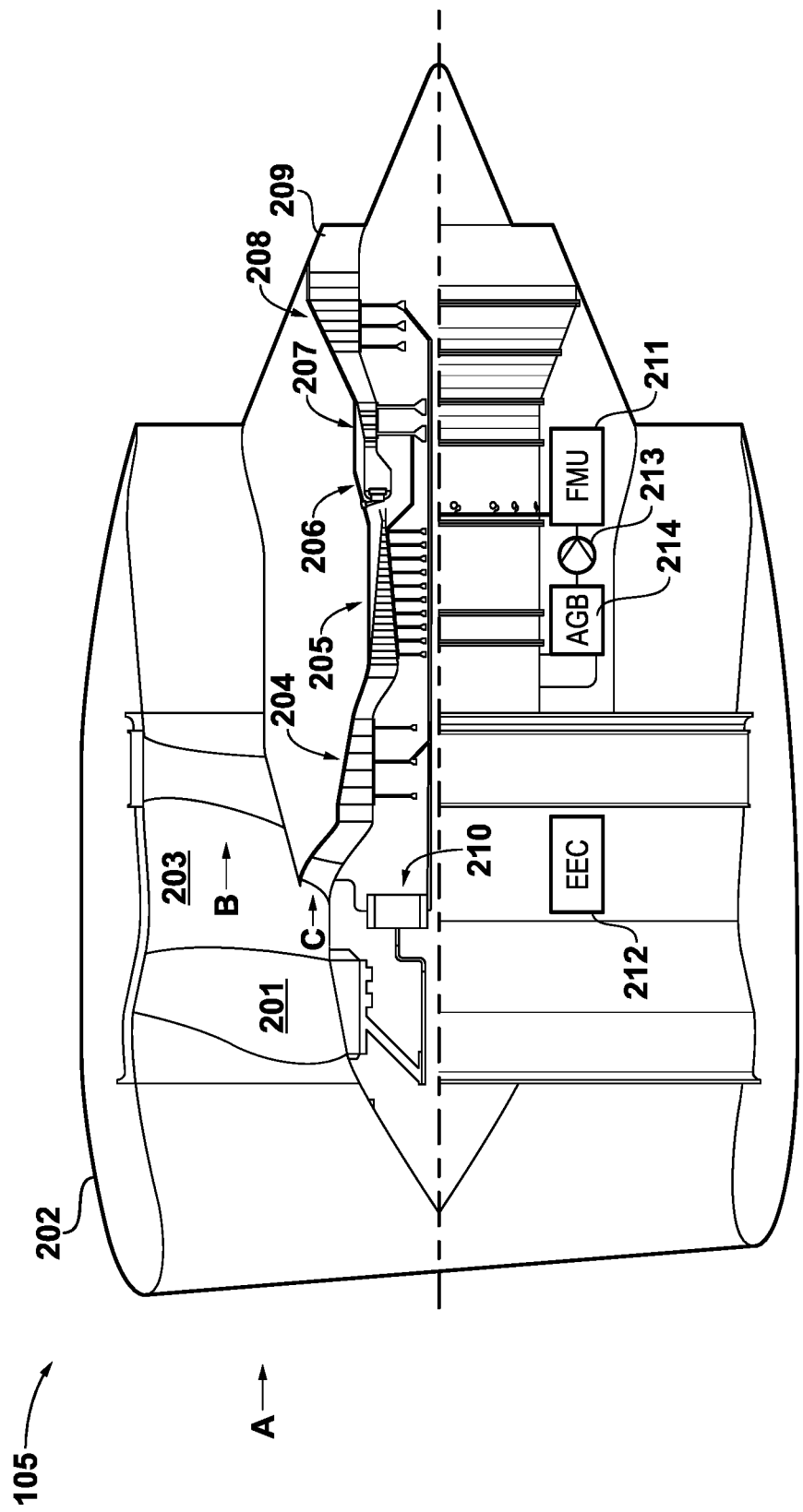
FIG. 2 shows a general arrangement of one of the engines of FIG. 1.

A general arrangement of one of the engines 105 for aircraft 102 is shown in FIG. 2.

In the present embodiment, the engine 105 is a turbofan, and thus comprises a ducted fan 201 located in a nacelle 202. The fan 201 receives intake air A and generates two airflows: a bypass flow B which passes axially through a bypass duct 203 and a core flow C which enters a core gas turbine.

The core gas turbine comprises, in axial flow series, a low-pressure compressor 204, a high-pressure compressor 205, a staged combustion system 206, a high-pressure turbine 207, and a low-pressure turbine 208.

In operation, the core flow C is compressed by the low-pressure compressor 204 and is then directed into the high-pressure compressor 205 where further compression takes place. The compressed air exhausted from the high-pressure compressor 205 is directed into the staged combustion system 206 where it is mixed with fuel and the mixture is combusted. In the present embodiment, the staged combustion system 206 comprises a rich-pilot, lean-main configuration injection system. Such combustor systems will be familiar to those skilled in the art.

Following combustion, the resultant hot combustion products are discharged and expand through, and thereby drive, the high-pressure turbine 207 and in turn the low-pressure turbine 208 before being exhausted via a core nozzle 209 to provide a small proportion of the overall thrust.

The fan 201 is driven by the low-pressure turbine 208 via a reduction gearbox 210. In the present embodiment, the reduction gearbox 210 takes the form of an epicyclic gearbox. In this specific embodiment, the reduction gearbox 210 is a planetary-type epicyclic gearbox and thus comprises a sun gear meshed with a plurality of planet gears located in a rotating carrier. In this example, five planet gears are provided. The planet gears are also meshed with a static ring gear. The rotating carrier is connected with the fan 201.

As described, in the present embodiment the engine 105 comprises a staged combustion system 206. Fuel is divided amongst pilot and main injectors by means of a fuel system controller, which in the present embodiment is provided by a fuel metering unit (FMU) 211 under control of an electronic engine controller (EEC) 212. Fuel is delivered to the fuel metering unit 211 by a fuel pump 213. In this embodiment, the fuel pump 213 is mechanically driven by an accessory gearbox 214, itself driven via a high-pressure spool radial driveshaft of known configuration (not shown). In alternative configurations, for example in a more electric engine (MEE) configuration, the fuel pump 213 may be electrically-driven.

FIG. 3

Figure 3:
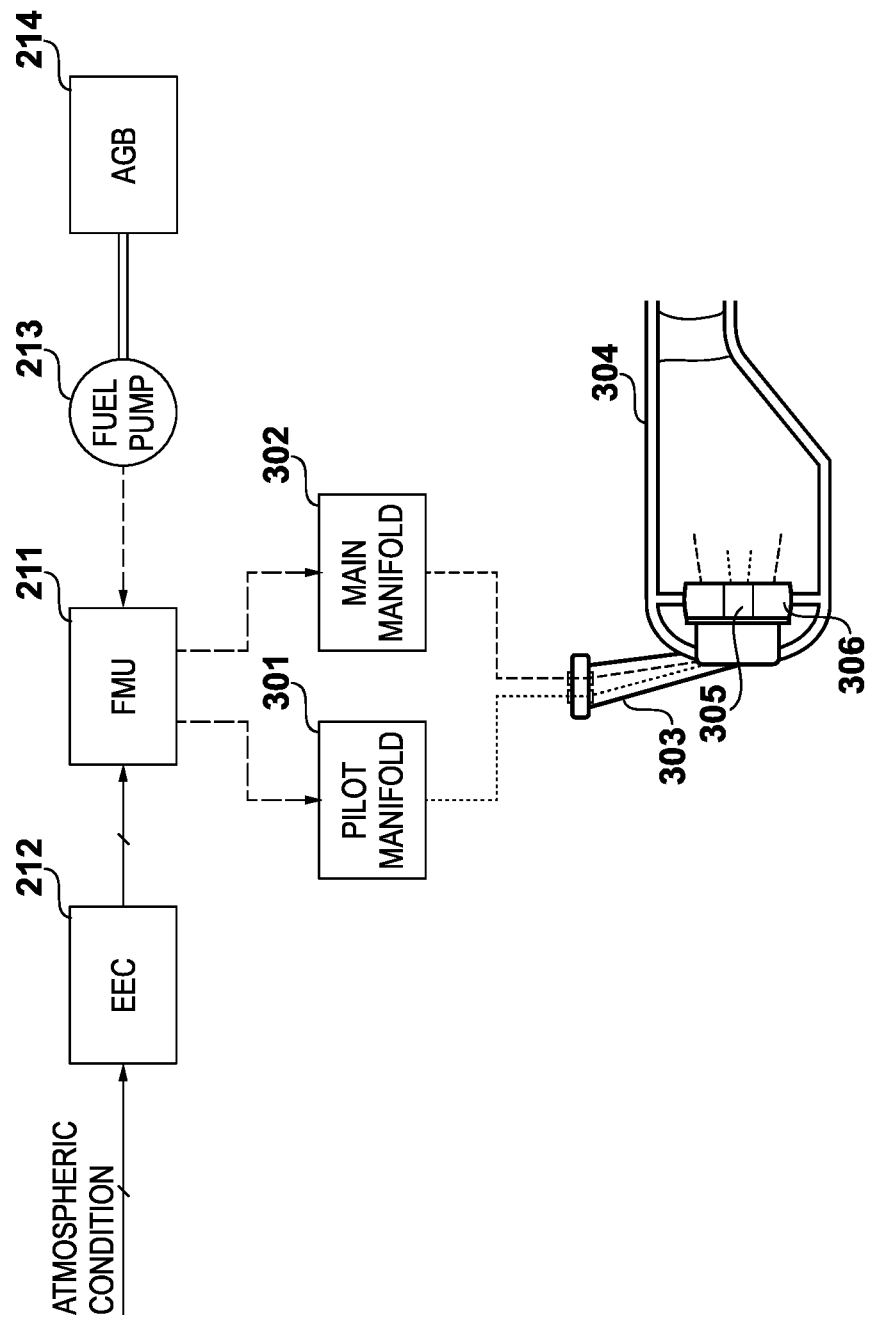
FIG. 3 shows the fuel system fluid and control arrangement of the engine of FIG. 2.

A block diagram illustrating the fuel system fluid and control arrangement is shown in FIG. 3.

In the present example, high-pressure fuel is delivered by the fuel metering unit 211 into a pilot manifold 301 and a main manifold 302. In the present embodiment, the staged combustion system 206 comprises a plurality of fuel nozzles 303 which are configured as duplex fuel injectors (also known as internally-staged). In the present embodiment, 16 circumferentially-spaced fuel nozzles 303 are disposed around an annular combustor can 304. As will be appreciated, more or indeed fewer fuel nozzles may be provided depending upon the physical engine size and design requirements. Further, different combustor configurations may be used, for example cannular, canned, etc.

Fuel from both the pilot manifold 301 and the main manifold 302 is delivered to all of the fuel nozzles 303 for injection into the combustor can 304. In the present embodiment, a central pilot injector 305 produces a pilot fuel spray in a primary zone of the combustor can 304, whilst a concentric main injector 306 produces a main fuel spray. Delivery of fuel via the pilot and main injectors 305 and 306 is staged, thus at low powers (and hence low air mass flows), fuel is delivered by the central pilot injector 305 at a rich fuel-air ratio (i.e. at an equivalence ratio greater than unity) for improved flame stability. In the present embodiment, as power and mass flow increases, a staging point is reached at which fuel is delivered by some or all of the main injectors 306 of the fuel nozzles 303, supplementing the fuel flow from the pilot injectors 305. The main injectors 306 are configured to inject fuel at a lean fuel-air ratio (i.e. at an equivalence ratio less than unity). At this point, airflow is such that the equivalence ratio immediately downstream of the pilot injectors 305 is also fuel-lean. In the present example, at higher power levels, fuel is injected by all main injectors 306.

Those skilled in the art will be familiar with such operation of staged combustion systems in order to effect lean burn at high powers whilst also observing flammability limits at lower powers. Furthermore, they will also be familiar with other staged combustion configurations, for example those with separate pilot and main injectors (as opposed to duplex or internally-staged), which may be arranged in parallel (radially separate, axially aligned) or series (axially separate, radially aligned). It will be understood that the principles disclosed herein may be applied to any staged combustion system comprising main and pilot injectors.

The balance of injection of fuel by the pilot injectors 305 and the main injectors 306 is controlled by the electronic engine controller 212, which provides control signals to the fuel metering unit 211 indicative of the total fuel that must be injected in the form of a fuel flow rate ($W_F$) and the ratio of pilot injector fuel flow to main injector fuel flow. The fuel metering unit 211 is configured to utilise these control signals to deliver the demanded fuel flow rate in accordance with the demanded overall fuel flow and pilot-main fuel flow ratio. In alternative embodiments, the electronic engine controller 212 may instead be configured to provide control signals to the fuel metering unit 211 which are indicative of the pilot fuel flow rate ($W_{Fpilot}$) and the main fuel flow rate ($W_{Fmain}$) It will of course be appreciated that the information conveyed is equivalent.

Prior art systems may simply use the power lever angle (PLA) setting to determine the overall fuel flow rate and the ratio of pilot injector fuel flow to main injector fuel flow. In the present embodiment, the electronic engine controller 212 is configured to determine the ratio of pilot injector fuel flow to main injector fuel flow in dependence upon atmospheric conditions. In an embodiment, the said atmospheric conditions are those causative of contrails.

FIGS. 4A & 4B

The reason for including this additional dimension to the determination of pilot-main fuel flow ratio is due to the soot emission characteristics of staged combustion systems that use rich pilot injection for low power flame stability, and lean main injection at higher power settings.

Figure 4:
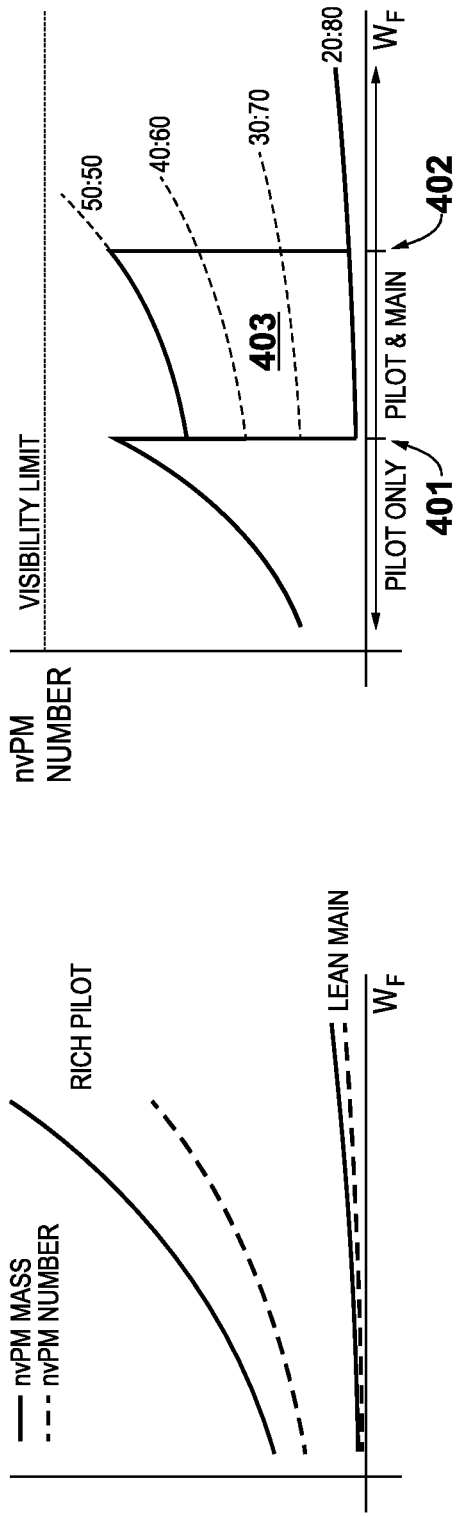
FIG. 4A is a chart showing the relationship between fuel flow rate and two non-volatile particulate matter parameters, mass and number.
FIG. 4B is a chart showing the relationship between fuel flow rate in the engine of FIG. 2 and non-volatile particulate matter number.

FIG. 4A is a chart showing the relationship between fuel flow rate and two non-volatile particulate matter (nvPM) parameters—number of particles (nvPM number) and total mass (nvPM mass). The various non-volatile particulate matter parameters are defined by the International Civil Aviation Organization. The dominant constituent of non-volatile particulate matter is soot, and so, in the present embodiments, non-volatile particulate matter number is used as the index of soot emissions, since the quantity of soot particles emitted per unit distance travelled by an aircraft has a substantial impact on contrail optical depth.

As can be seen in the chart, both the quantity and overall mass of non-volatile particulate matter emitted due to rich pilot injection is far greater than that emitted during lean main injection for the same rate of fuel-flow. (As noted previously, in order to maximise injection capacity, in the present example pilot injectors are used in tandem with the main injectors at higher power settings, however the mass flow of air into the combustion system is such that the equivalence ratio remains lean and thus the propensity for non-volatile particulate matter to be formed is much reduced.)

The inventors have determined that this characteristic of staged combustion systems of the type contemplated herein may be utilised to vary the non-volatile particulate matter mass and number.

FIG. 4B is a chart which shows the overall fuel flow rate into the combustion system to achieve a target power level, against the non-volatile particulate matter number. At low powers, and hence low total fuel flow and low mass flow of air into the combustion system, only the pilot injectors 305 are utilised. Because of this, the non-volatile particulate matter number rises as shown by the dashed line for rich pilot emissions in the chart of FIG. 4A.

After a first staging point 401, i.e. a power setting at which the total fuel flow exceeds a threshold, there is sufficient mass flow of air for lean combustion to be stable and thus fuel may be injected using the main injectors 306. In the present example, after the first staging point 401 the engine electronic controller 212 commands a default pilot-main fuel flow ratio (expressed as a percentage) of 20:80. This results in the minimum attainable nvPM number and the best utilisation of the injection capacity. It will be appreciated that in other implementations, this minimum may be varied, for example zero fuel could be injected by the pilot injectors leading to a pilot-main fuel flow ratio of 0:100.

In the present embodiment, a second staging point 402 exists at even higher power where, due to the power setting demanded, the pilot-main fuel flow ratio must be skewed heavily in favour of the main injectors so that sufficient fuel may be delivered for a required turbine entry temperature. In this embodiment, a fixed ratio of 20:80 is selected to achieve this, although it will be appreciated that depending on the pilot injector sizing the proportion of fuel delivered by the pilot injectors may reduce with increasing total fuel flow up to the maximum power setting.

The inventors have determined that between the first and second staging points 401 and 402 exists a fuel flow ratio loop 403 in which a demand for an overall fuel flow may be met by a plurality of pilot-main fuel flow ratios. In the present example, a maximum pilot-main fuel flow ratio of 50:50 may meet the overall range of fuel flow demand encompassed by the loop 403. Such a limit may be introduced to mitigate any impact on combustion efficiency, or to ensure compliance with any regulatory limits on emissions of non-volatile particulate matter. It will be appreciated that the loop 403 covers the typical range of overall fuel flow demanded during the cruise phase of a typical mission—precisely the phase in which the majority of contrails are formed.

It will be appreciated that in other implementations the second staging point 402 may not be required, due to for example changes in injector capacity, engine size, range of power settings, etc. In such a case, the fuel flow ratio loop 403 could extend from the first staging point 401 up to the maximum power setting, and be bounded by the limiting value of the pilot injector flow rate. In this way, the pilot-main fuel flow ratio may be varied over a greater range of phases in the flight envelope, for example during latter phases of an initial climb or during step climbs.

FIGS. 5A & 5B

Figure 5:
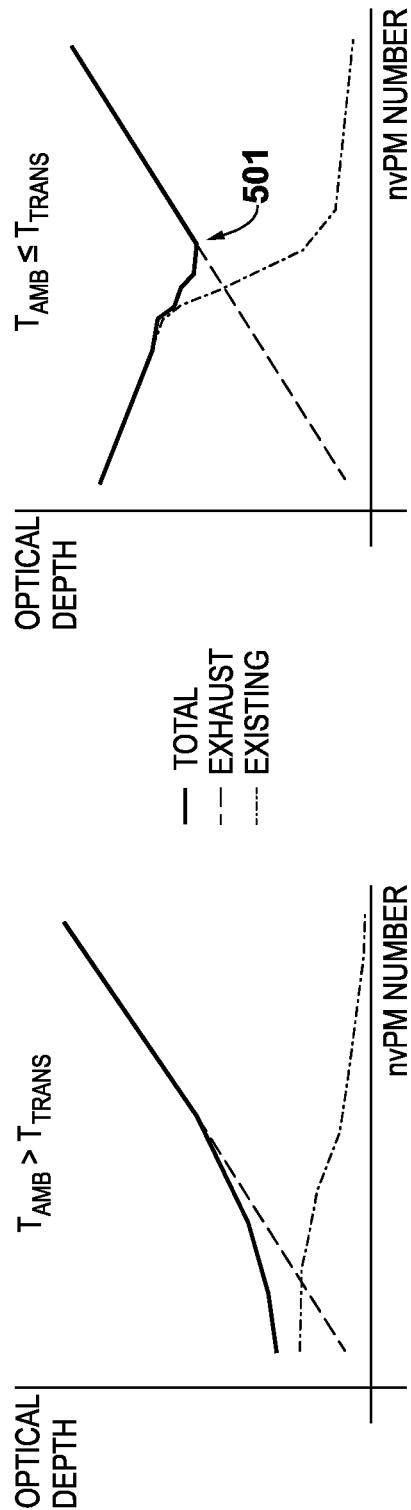
FIGS. 5A and 5B are charts showing the relationship between non-volatile particulate matter number and contrail optical depth at different ambient temperatures.

FIGS. 5A and 5B are charts adapted from B. Kärcher and F. Yu, "Role of aircraft soot emissions in contrail formation", *Geophysical Research Letters*, vol. 36, no. 1, 2009, which is incorporated herein by reference. The charts show the dependence of contrail optical depth on nvPM number at a fixed ambient relative humidity over water. The contributing factors to the contrails' optical depth (solid) are ice particles formed from deposition on exhaust soot (dashed), and ice particles formed from emitted and/or existing ambient liquid particles (dot-dashed). FIG. 5A shows the relationship for ambient temperatures above some transition temperature ($T_{AMB} > T_{TRANS}$), and FIG. 5B shows the relationship for ambient temperatures at or below the transition temperature ($T_{AMB} \leq T_{TRANS}$)

As shown in FIG. 5A, with ambient temperatures greater than the transition temperature, and at higher nvPM numbers, exhausted non-volatile particulate matter is largely determinative of the contrail's optical depth. At lower nvPM numbers, emitted and/or existing ambient liquid particles which freeze in the exhaust plume begin to dominate the contribution to overall optical depth. As can be seen, above the transition temperature, the relationship between nvPM number and optical depth is one which is monotonically increasing.

Referring to FIG. 5B, for ambient temperatures at or below the transition temperature, a much larger number of emitted and/or existing ambient liquid particles freeze and thus lead to an increase in contrail optical depth at low nvPM numbers. It will be seen that the relationship between nvPM number and optical depth is no longer monotonic Thus there exists a stationary point at a transition value 501.

Thus whilst an aero engine may be operating with lean combustion and thus a low rate of soot emissions, it may still be forming a contrail having greater optical depth than an engine producing substantially greater soot emissions. Depending upon other factors, this could have a more detrimental climate impact.

In the research undertaken by Kärcher and Yu referenced above, modelling suggested that there is a transition from the monotonically-increasing relationship of FIG. 5A to the non-monotonicity of FIG. 5B. As defined herein, the transition temperature $T_{TRANS}$ is, when considering a reduction in temperature, the temperature at which the relationship ceases to be monotonically increasing, with a stationary point appearing at the transition value 501.

The transition temperature for any particular ambient relative humidity over water may be determined in accordance with the modelling approach set out in B. Kärcher, U. Burkhardt, A. Bier, L. Bock and I. Ford, "The microphysical pathway to contrail formation", *Journal of Geophysical Research: Atmospheres*, vol. 120, no. 15, pp. 7893-7927, 2015, which is incorporated herein by reference.

As described with reference to FIGS. 4A and 4B, control of pilot-main fuel flow ratio in a staged combustion system may be used to effect changes in nvPM number. This characteristic, in conjunction with the relationships between nvPM number and optical depth described with reference to FIGS. 5A and 5B, allows the electronic engine controller 212 to effect changes in optical depth.

Hence, in an embodiment, the determination of the pilot-main fuel flow ratio comprises identifying a condition to the effect that an optical depth of a condensation trail produced by the engine should be reduced or increased. In response to identifying that it should be reduced, a pilot-main fuel flow ratio is evaluated that varies soot production to reduce ice particle formation. In response to identifying that the optical depth should be increased, a pilot-main fuel flow ratio is evaluated that varies soot production to increase ice particle formation.

FIG. 6

Figure 6:
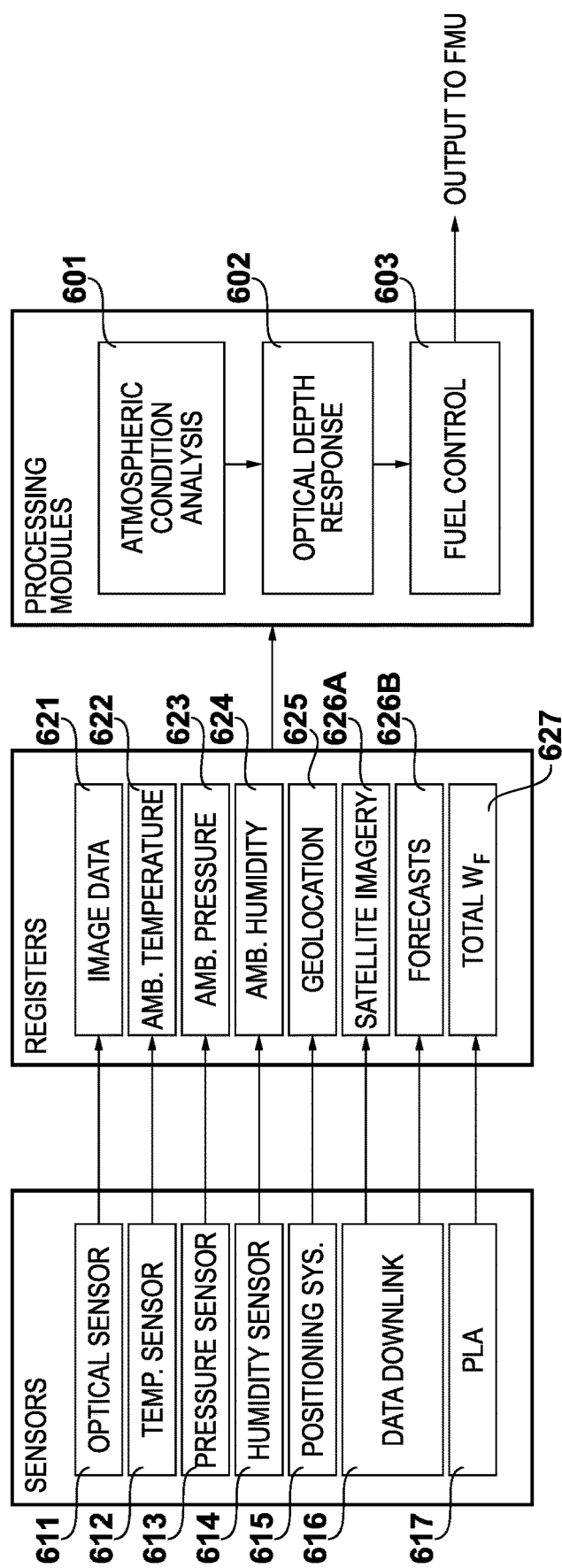
FIG. 6 shows sensor inputs, memory registers and processing modules in the electronic engine controller of the engine of FIG. 2.

A block diagram is shown in FIG. 6 which illustrates sensor inputs, memory registers and processing modules in the electronic engine controller 212 to command a particular pilot-main fuel flow ratio in dependence upon atmospheric conditions.

In terms of processing functionality, in the present embodiment the electronic engine controller 212 comprises an atmospheric condition analysis module 601, an optical depth response module 602, and a fuel control module 603. The atmospheric condition analysis module 601 will be described in further detail with reference to FIG. 7. The optical depth response module 602 will be described in further detail with reference to FIGS. 8 and 9. The fuel control module 603 will be described in further detail with reference to FIG. 10.

The modules 601, 602, and 603 operate together to form an appropriate contrail optical depth response to an atmospheric condition in the form of a pilot-main fuel ratio for implementation by the fuel metering unit 211.

It will be appreciated that whilst in the present embodiment the modules 601, 602 and 603 are described as software running on the electronic engine controller 212, they may be implemented as software running on separate control units or even implemented in dedicated hardware. It will also be appreciated that some or all of the processing steps described herein for the modules 601, 602 and 603 could be carried out at a location which is physically remote from the aircraft, making use of suitable datalinks to transmit data from the aircraft to the processing location and vice versa.

In the present embodiment, each module 601, 602, and 603 is configured such that it has access to a plurality of registers storing various sensor outputs and/or downloaded data.

An optical sensor 611 is configured to produce image data 621 of the exhaust plume region of the engine 105. This facilitates analysis of the optical depth of a contrail being generated by the engine 105 during flight, and thus closed loop control of optical depth. Additionally or alternatively, other types of sensors such as lidar or radar may be used to generate data suitable for analysis of the contrail optical depth.

Various ambient condition sensors may be provided to facilitate assessment of atmospheric conditions. In the present embodiment, a temperature sensor 612 (for example, an outside air temperature probe or similar), a pressure sensor 613 (for example, an aneroid barometer forming part of a pitot-static arrangement or similar), and a humidity sensor 614 (for example, a hygrometer or similar) write to respective registers for ambient temperature 622, ambient pressure 623 (from which altitude may be derived), and ambient humidity 624.

A positioning system 615 (for example Global Positioning System, Galileo, etc.) provides geolocation data 625. A data downlink 616 (for example satellite communication) facilitates acquisition of satellite imagery 626A and weather forecasts 626B to allow identification of regions conducive to contrail formation and/or contrail persistence.

The output of a power level angle sensor 617 in the cockpit of the aircraft 102 is converted into total fuel flow ($W_F$) demand 627 by, for example, a surrogate engine model in the electronic engine controller 212. The design of such control loops will be familiar to those skilled in the art.

It will be appreciated that in alternative embodiments only a subset of the sensors and registers may be selected for implementation. For example, optical sensors may be deployed and be the sole means of detection of contrail formation. Conversely, only temperature, pressure and humidity instruments may be selected for use in detection of conditions which indicate that contrails will form, and so on.

FIG. 7

Figure 7:
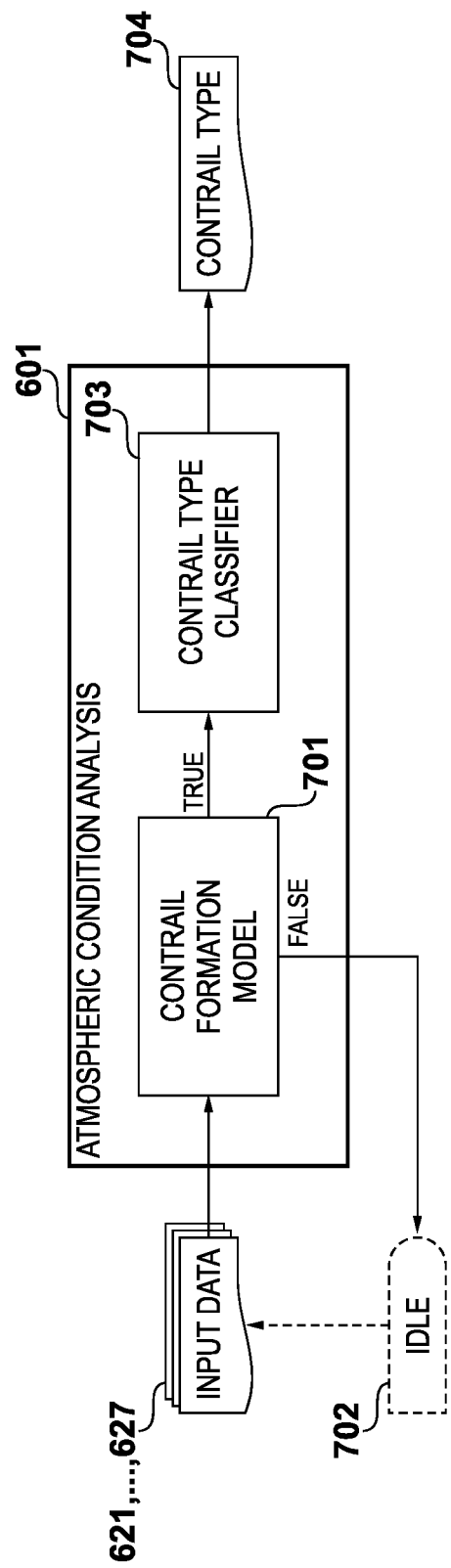
FIG. 7 shows an atmospheric condition analysis module of the processing modules of FIG. 6.
Figure 8:
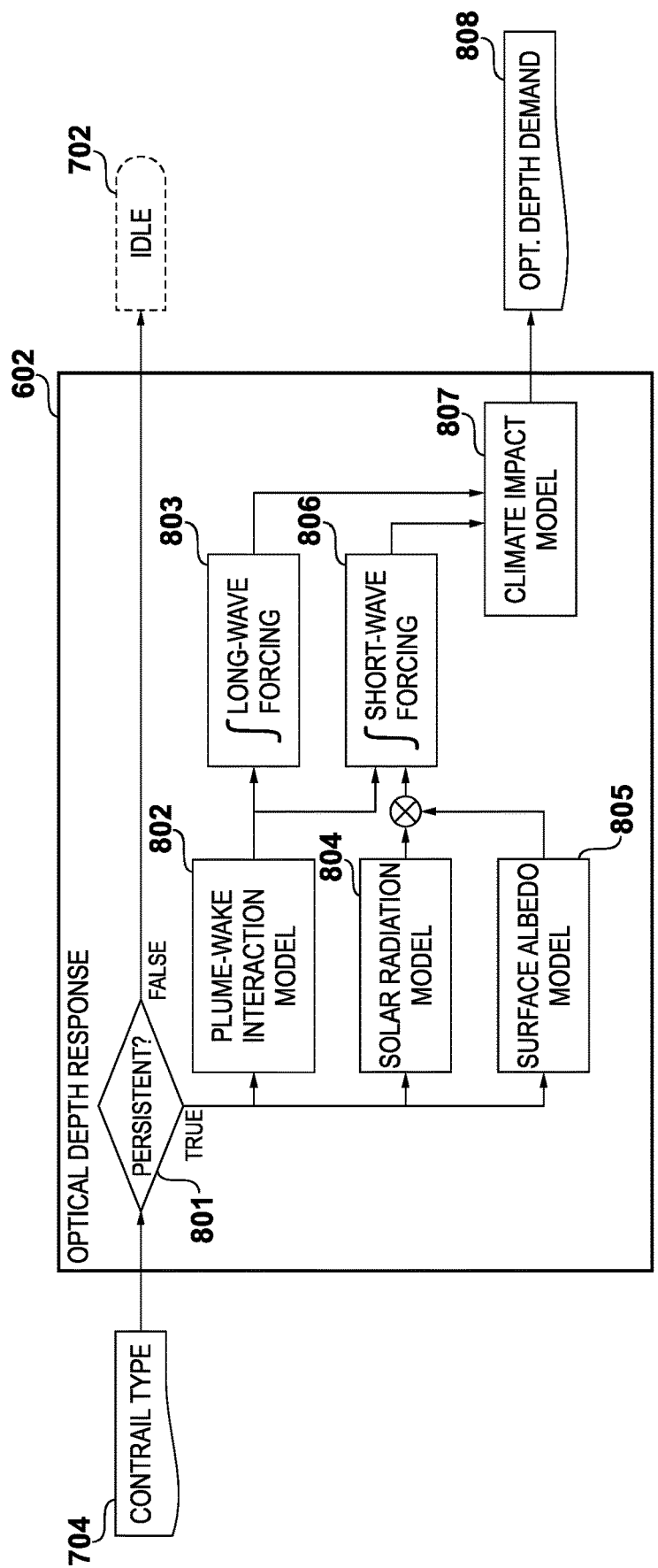
FIG. 8 shows a plume-wake interaction model of the atmospheric condition analysis module of FIG. 7.

The atmospheric condition analysis module 601 is shown in detail in FIG. 7.

Input data obtained from some or all of the registers 621-627 is obtained by a contrail formation model 701. The contrail formation model 701 is configured to determine whether or not contrail formation is likely under current ambient conditions and engine operating point, irrespective of subsequent persistence.

In an embodiment, the contrail formation model 701 uses the real- or near real-time atmospheric condition data measured by the sensors. For example, the measurement of ambient humidity 624 by the humidity sensor 614 may be used, or the image data 621 produced by the optical sensor 611.

In a specific embodiment, the Schmidt-Appleman criterion is applied and coupled with an assumption of a linear or approximately linear mixing trajectory in the space defined by temperature and water-vapour partial pressure. To perform this processing, the contrail formation model 701 utilises the measurements of ambient temperature 622, ambient pressure 623, and ambient humidity 624.

In an alternative embodiment, the contrail formation model 701 utilises the satellite imagery 626A and/or the weather forecasts 626B to determine whether atmospheric conditions are such that contrails will form. In a specific embodiment, the satellite imagery 626A is used in conjunction with the geolocation data 625 and an altitude reading derived from the ambient pressure 623 to confirm whether or not other aircraft in the vicinity have caused contrails or not. In a specific embodiment, the weather forecasts 626B are coupled to the Schmidt-Appleman criterion approach described above.

In the present embodiment, if the contrail formation model 701 determines that no contrail will form given current atmospheric conditions, then no action is taken and the atmospheric condition analysis module 601 proceeds to an idle process 702 where it waits until new input data are available.

If the contrail formation model 701 determines that a contrail will form, then control proceeds to a contrail type classifier 703 which is configured to determine, given ambient conditions, whether the contrail will persist or not. This may be achieved by assessing the ambient relative humidity with respect to ice: if the ambient air is supersaturated with respect to ice, then the contrail will persist. The output of the contrail type classifier 703 is the determined contrail type 704, and is provided to the optical depth response module 602.

FIG. 8

The optical depth response module 602 receives the determined contrail type 704 from the atmospheric condition analysis module 601, and proceeds to ask a question at a decision block 801 as to whether the contrail will be persistent, or not.

If this question is answered in the affirmative, then several models are invoked to assess the optimal response in terms of adjustments to the optical depth of the contrail.

A plume-wake interaction model 802 is provided which assesses the effect of the wake of the aircraft 102 on the exhaust plume of the engine 105. This model will be described in further detail with reference to FIG. 9. In the present embodiment, the model 802 outputs a set of predictions of the time-varying properties of a plurality of contrails, each caused by exhaust plumes having different nvPM numbers. The output of model 802 is provided to a long-wave forcing model 803, which is configured to determine the time-integrated radiative forcing per unit length of each contrail due to long-wave (i.e. warming) effects over their expected lifetimes. In addition to model 802, a solar radiation model 804 and a surface albedo model 805 are executed and their outputs combined. The solar radiation model 804 is configured to determine the strength and orientation of incoming sunlight over the expected lifetime of the contrail in the post-vortex regime. The surface albedo model 805 is configured to determine the albedo of surfaces (including other clouds) which would receive incoming sunlight in the absence of a contrail formed by the aircraft. In the present embodiment, models 804 and 805 utilise the satellite imagery 626A and weather forecast data 626B to perform this assessment.

The combined output of models 804 and 805 are supplied, along with the output of model 802, to a short-wave forcing model 806 which is configured to determine the time-integrated radiative forcing due to short-wave (i.e. cooling) effects over the expected lifetime of the predicted set of contrails generated by the model 802.

The outputs of the long-wave forcing model 803 and the short-wave forcing model 806 are supplied to a climate impact model 807 which determines the optimal optical depth to achieve the best balance between the magnitudes of the modelled short-wave cooling and long-wave warming effects.

In this way, the model 807 determines that the optical depth of the condensation trail should be increased or decreased on the basis of a time-integrated effect of a persistent contrail over its lifespan given a current atmospheric condition and a predicted future atmospheric condition. The output of model 807 is an optical depth demand 808, which is supplied to the fuel control model 603. The optical depth demand 808 is a target optical depth for the contrail.

In the present embodiment, the climate impact model 807 is configured to consider short-wave cooling to be a desirable effect, and long-wave warming to be an undesirable effect, and thus tends to produce an optical depth demand 808 which reduces the net warming impact of the contrail.

In the present example, if the question asked at decision block 801 is answered in the negative, then the idle process 702 is invoked until new input data are available. In alternative embodiments, measures may still be taken to alter the optical depth, possibly adopting a similar approach to that for persistent contrails.

FIG. 9

Figure 9:
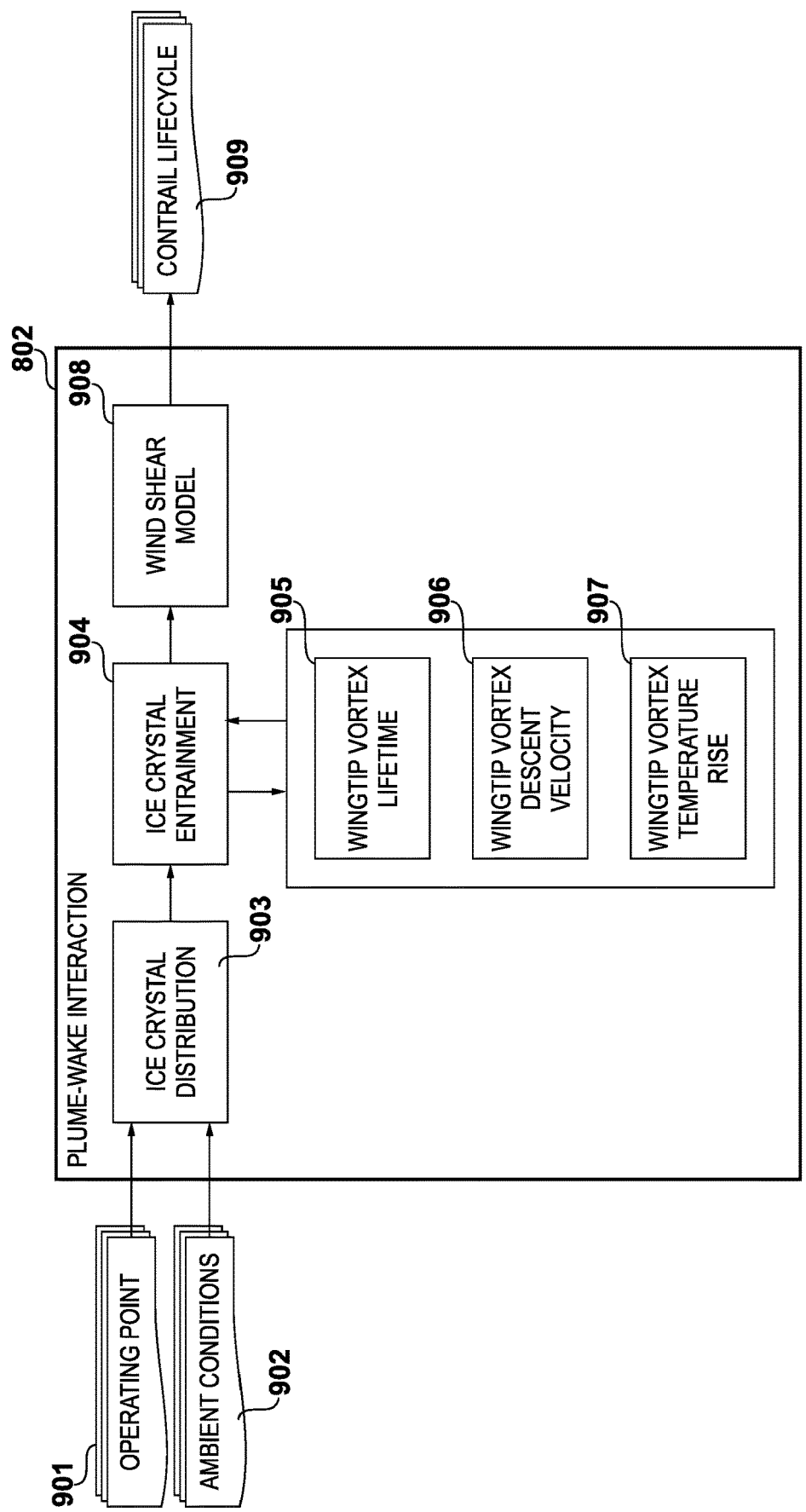
FIG. 9 shows an optical depth response module of the processing modules of FIG. 6.

The plume-wake interaction model 802 is shown in more detail in FIG. 9.

The model 802 obtains input data pertaining to, in particular, the operating point 901 of the engine 105 (for example intake temperature and pressure, power lever angle setting, overall fuel flow rate, etc.) and the ambient conditions 902 at the current location of the aircraft 102 (for example ambient temperature 622, ambient pressure 623, ambient humidity 624, etc.).

These input data are supplied to an ice crystal distribution model 903, which is configured to determine, for each of a plurality of possible nvPM numbers, the initial particle size distribution of ice particles formed in the exhaust plume of the engine 105. In the present embodiment, this is performed on the basis of factors including ambient temperature 622, ambient pressure 623, ambient humidity 624, the mass of water vapour emitted by the engine per unit distance of travel, and the efficiency of the engine 105. In this example the ice crystal distribution model 903 is configured to determine the mass of water vapour using the data pertaining to engine operating point 901, i.e. power lever setting, fuel flow rate, fuel properties, calculated airspeed, etc.

The ice crystal distributions are supplied to an ice crystal entrainment model 904, which is configured to determine the extent to which particles in the engine exhaust become captured by wingtip vortices of the aircraft 102.

This is modelled because a significant proportion of ice crystals which would otherwise form a persistent contrail may be destroyed by heating in the vortices, thereby reducing the optical depth of the contrail.

The ice crystal entrainment model 904 is configured to determine the particle size distribution of ice particles initially captured within the wingtip vortex core, given an initial particle size distribution of a newly formed contrail, in dependence upon the location of the corresponding engine relative to the wingtip. It is further configured to determine the number or ratio of ice particles which remain after the adiabatic heating experienced within the wingtip vortex core during the lifetime of the wingtip vortex. The remaining ice particles also include those ice particles which were detrained from the vortex prior to its breakup.

In order to model this effect, the ice crystal entrainment model 904 calls upon one or more other models. In this example, a wingtip vortex lifetime model 905 is configured to determine the lifetime of a wingtip vortex in dependence upon such factors as the strength of ambient turbulence, the rate of change of ambient temperature with altitude, and/or the instantaneous aircraft weight (e.g. taking account of the amount of fuel burned so far during the flight). A vortex descent velocity model 906 is configured to determine the downward velocity of a wingtip vortex, in dependence upon factors including the instantaneous aircraft weight, and aircraft configuration. A vortex temperature rise model 907 is configured to determine the temperature change likely to be experienced within the vortex core as a result of the determined change in altitude during its descent and/or the speed of its descent.

It is contemplated that further models could be provided, for example a model from which can be determined the proportion, of those ice particles not captured/retained by the wingtip vortex core, which experience sufficient adiabatic heating in the region of downwash between the aircraft's wingtip vortices so as to be eliminated.

The output of ice crystal entrainment model 904 is then supplied to a wind shear model 908 which predicts the degree of horizontal spreading of the contrail over its expected lifetime. This prediction is performed using the vertical extent of the post-vortex contrail, and current and future weather conditions obtained from the weather forecasts 626B. This is performed to account for the contrail's short- and long-wave effects.

The output from the plume-wake interaction model 802 is thus a set of contrail lifecycle data 909 for a plurality of nvPM numbers.

FIG. 10

Figure 10:
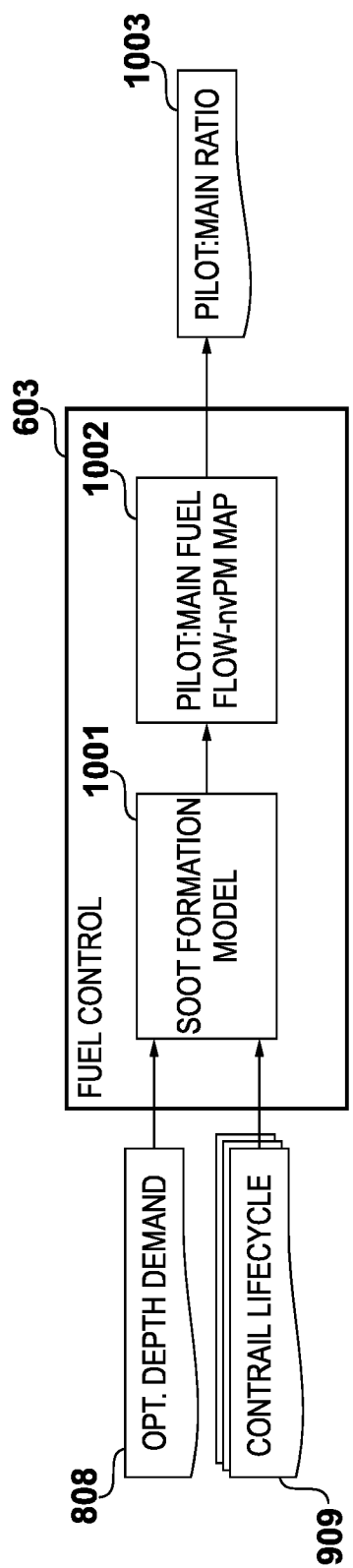
FIG. 10 shows a fuel control module of the processing modules of FIG. 6.

The fuel control module 603 is shown in greater detail in FIG. 10.

Initially, the optical depth demand 808 is supplied to a soot formation model 1001. Model 1001 is configured to determine a target nvPM number under the current ambient atmospheric conditions, in particular the ambient temperature, which will meet the optical depth demand 808. In the present embodiment, this is achieved by use of the contrail lifecycle data 909.

In an alternative embodiment, the model 1001 may implement a microphysical simulation to establish the target nvPM number.

This target nvPM number is then used as a set point for evaluating an appropriate value for the pilot-main fuel flow ratio. In the present embodiment, a map 1002 is used, allowing an efficient lookup of pilot-main fuel flow ratio based on an nvPM number and overall fuel flow rate. The output of map 1002 is then the pilot-main fuel flow ratio 1003 for supply to the fuel metering unit 211. In an alternative embodiment, a surrogate model may be implemented to model the combustion process based on real time parameters.

As shown in FIGS. 5A and 5B, the relationship between optical depth and nvPM effectively splits into two regimes: one (FIG. 5A) at or above a transition temperature where there is a generally monotonic relationship between nvPM and optical depth, and another (FIG. 5B) below the transition temperature where the minimum optical depth is found at the transition value 501, with both a decrease and an increase in nvPM number resulting in optical depth increasing.

Thus the effect of the combination of the soot formation model 1001 and the pilot-main fuel flow ratio map 1002 is to control the pilot-main fuel flow ratio by taking these different regimes into account.

In functional terms, therefore, the fuel control module 603 compares a newly-received optical depth demand 808 with the current value thereof. Thus the fuel control module 603 determines whether the optical depth of a contrail should be reduced, or increased.

If the optical depth demand 808 is such that the optical depth of a contrail should be reduced, the fuel control module 603 evaluates a pilot-main fuel flow ratio that varies nvPM number (and thus soot production) to minimise ice particle formation.

The use of the soot formation model 1001 and map 1002 effectively compares a measurement of ambient temperature to the transition temperature. Then, if the ambient temperature is greater than the transition temperature, a pilot-main fuel flow ratio is determined that, if possible, decreases soot production to achieve the target optical depth. It will be appreciated that if the lowest possible level of soot production has already been reached, then the pilot-main fuel flow ratio will remain the same.

If the ambient temperature is less than or equal to the transition temperature, a pilot-main fuel flow ratio is determined that either decreases or increases soot production. This is performed in dependence upon whether the current pilot-main fuel flow ratio, and hence nvPM number, is above or below the transition value 501. The minimum optical depth that may be achieved is that obtained when the pilot-main fuel flow ratio corresponds to the transition value 501.

If the optical depth demand 808 is such that the optical depth of a contrail should be increased, the fuel control module 603 evaluates a pilot-main fuel flow ratio that varies nvPM number (and thus soot production) to increase ice particle formation.

The effect of the fuel control module's configuration is then to obtain a measurement of ambient temperature.

If the ambient temperature is greater than the transition temperature, a pilot-main fuel flow ratio is determined that increases soot production to achieve the target optical depth.

If the ambient temperature is less than or equal to the transition temperature, and the current pilot-main fuel flow ratio corresponds to an nvPM number that is greater than the transition value 501, then a pilot-main fuel flow ratio is determined that increases the index of soot emissions.

If the ambient temperature is less than or equal to the transition temperature, and the current pilot-main fuel flow ratio corresponds to an nvPM number that is less than or equal to the transition value 501, then a pilot-main fuel flow ratio is determined that decreases the index of soot emissions In some embodiments, the decision as to whether to increase or decrease nvPM number to increase optical depth may be influenced by which operational change is associated with, for example, the lowest fuel consumption. In the present embodiment, this means that the pilot-main fuel flow ratio is skewed in favour of injection by the main injectors 306, which may be associated with lower fuel consumption. In alternative embodiments, other parameters may influence this decision, such as emissions of unburnt hydrocarbons, oxides of nitrogen, or even impact on life-limited parts, etc.

Various examples have been described, each of which feature various combinations of features. It will be appreciated by those skilled in the art that, except where clearly mutually exclusive, any of the features may be employed separately or in combination with any other features and the invention extends to and includes all combinations and sub-combinations of one or more features described herein.

The invention claimed is:

1. A method of operating a staged combustion system in an aircraft gas turbine engine, comprising:
providing pilot injectors for rich combustion and main injectors for lean combustion in said staged combustion system;
identifying an atmospheric condition;
determining a ratio of pilot fuel flow rate for the pilot injectors to main fuel flow rate for the main injectors in response to the atmospheric condition;
wherein the determining step comprises:
identifying the atmospheric condition to the effect that a model indicates that reducing an optical depth of a condensation trail produced by the engine would reduce a net warming impact of the condensation trail;
evaluating the ratio of pilot fuel flow rate to main fuel flow rate that varies soot production to reduce ice particle formation;
wherein the evaluating step comprises:
obtaining a measurement of an ambient temperature from a temperature sensor;
in response to the ambient temperature being greater than a transition temperature, evaluating the ratio of pilot fuel flow rate to main fuel flow rate that decreases an index of soot emissions;
in response to the ambient temperature being less than or equal to the transition temperature and a current index of soot emissions being less than a transition value, evaluating the ratio of pilot fuel flow rate to main fuel flow rate that increases the index of soot emissions;
in response to the ambient temperature being less than or equal to the transition temperature and the current index of soot emissions being greater than the transition value, evaluating the ratio of pilot fuel flow rate to main fuel flow rate that decreases the index of soot emissions; and
injecting fuel by the pilot injectors and the main injectors in accordance with said ratio to control the index of soot emissions caused by combustion of fuel therein.

2. The method of claim 1, in which the index of soot emissions is the quantity of soot particles discharged from the combustor per unit mass of fuel injected by both the pilot injectors and the main injectors.

3. The method of claim 1, further comprising detecting the atmospheric condition using a measurement device, which comprises one or more of:
a humidity sensor configured to sense an atmospheric humidity;
an optical sensor configured to sense the formation, or not, of the condensation trail.

4. The method of claim 1, further comprising inferring the atmospheric condition, using location data in combination with one or more of:
satellite imagery;
weather forecasts.

5. The method of claim 1, in which the determining step comprises:
identifying the atmospheric condition to the effect that the model indicates that reducing or increasing the optical depth of the condensation trail produced by the engine on the basis of a time-integrated effect of a persistent condensation trail over the lifespan of the persistent condensation trail given a current atmospheric condition and a predicted future atmospheric condition would reduce the net warming impact of the persistent condensation trail.

6. A gas turbine engine for an aircraft, comprising:
a staged combustion system having pilot injectors and main injectors;
a fuel metering system configured to control fuel flow to the pilot injectors and the main injectors;
a fuel system controller configured to: identify an atmospheric condition; determine a ratio of pilot fuel flow rate for the pilot injectors to main fuel flow rate for the main injectors in response to the atmospheric condition; and
wherein the fuel system controller is configured to determine the ratio of pilot fuel flow rate to main fuel flow rate by:
identifying the atmospheric condition to the effect that reducing an optical depth of the condensation trail would reduce a net warming impact of the condensation trail;
evaluating the ratio of pilot fuel flow rate to main fuel flow rate that varies soot production to reduce ice particle formation;
wherein the evaluating step comprises:
obtaining a measurement of an ambient temperature from a temperature sensor;
in response to the ambient temperature being greater than or equal to a transition temperature, evaluating the ratio of pilot fuel flow rate to main fuel flow rate that decreases an index of soot emissions;
in response to the ambient temperature being less than or equal to the transition temperature and a current index of soot emissions being less than a transition value, evaluating the ratio of pilot fuel flow rate to main fuel flow rate that increases the index of soot emissions;
in response to the ambient temperature being less than or equal to the transition temperature and the current index of soot emissions being greater than the transition value, evaluating the ratio of pilot fuel flow rate to main fuel flow rate that decreases soot production; and
inject fuel by the pilot injectors and the main injectors in accordance with said ratio to control the index of soot emissions caused by combustion of the fuel therein.

7. The gas turbine engine of claim 6, in which the index of soot emissions is the quantity of soot particles discharged from the combustor per unit mass of fuel injected by both the pilot injectors and the main injectors.

8. The gas turbine engine of claim 6, further comprising a measurement device configured to detect the atmospheric condition, the measurement device comprising one or more of:
a hygrometer configured to sense an atmospheric humidity;
an optical sensor configured to sense the formation, or not, of the condensation trail.

9. The gas turbine engine of claim 6, in which the fuel system controller is configured to infer the atmospheric condition from one or more of:
satellite imagery;
weather forecasts.

10. The gas turbine engine of claim 6, in which the fuel system controller is configured to determine the ratio of pilot fuel flow rate to main fuel flow rate by:
identifying the atmospheric condition to the effect that reducing or increasing the optical depth of the condensation trail produced by the engine on the basis of a time-integrated effect of a persistent condensation trail over the lifespan of the persistent condensation trail given a current atmospheric condition and a predicted future atmospheric condition would reduce the net warming impact of the persistent condensation trail.

11. A gas turbine engine for an aircraft, comprising:
a staged combustion system having pilot injectors and main injectors;
a fuel metering system configured to control fuel flow to the pilot injectors and the main injectors;
a fuel system controller configured to: identify an atmospheric condition; determine a ratio of pilot fuel flow rate for the pilot injectors to main fuel flow rate for the main injectors in response to the atmospheric condition; and
wherein the fuel system controller is configured to determine the ratio of pilot fuel flow rate to main fuel flow rate by:
identifying the atmospheric condition to the effect that increasing an optical depth of the condensation trail would reduce a net warming impact of the condensation trail;
evaluating the ratio of pilot fuel flow rate to main fuel flow rate that varies soot production to increase ice particle formation;
wherein the evaluating step comprises:
obtaining a measurement of an ambient temperature from a temperature sensor;
in response to the ambient temperature being greater than a transition temperature, evaluating the ratio of pilot fuel flow rate to main fuel flow rate that increases an index of soot emissions;
in response to the ambient temperature being less than or equal to the transition temperature and a current index of soot emissions being greater than a transition value, evaluating the ratio of pilot fuel flow rate to main fuel flow rate that increases the index of soot emissions;
in response to the ambient temperature being less than or equal to the transition temperature and the current index of soot emissions being less than or equal to the transition value, evaluating the ratio of pilot fuel flow rate to main fuel flow rate that decreases the index of soot production; and
inject fuel by the pilot injectors and the main injectors in accordance with said ratio to control the index of soot emissions caused by combustion of fuel therein.

12. The gas turbine engine of claim 11, in which the index of soot emissions is the quantity of soot particles discharged from the combustor per unit mass of fuel injected by both the pilot injectors and the main injectors.

13. The gas turbine engine of claim 11, further comprising a measurement device configured to detect the atmospheric condition, the measurement device comprising one or more of:
a hygrometer configured to sense an atmospheric humidity;
an optical sensor configured to sense the formation, or not, of the condensation trail.

14. The gas turbine engine of claim 11, in which the fuel system controller is configured to infer the atmospheric condition from one or more of:
satellite imagery;
weather forecasts.

15. The gas turbine engine of claim 11, in which the fuel system controller is configured to determine the ratio of pilot fuel flow rate to main fuel flow rate by:
identifying the atmospheric condition to the effect that reducing or increasing the optical depth of the condensation trail produced by the engine on the basis of a time-integrated effect of a persistent condensation trail over the lifespan of the persistent condensation trail given a current atmospheric condition and a predicted future atmospheric condition would reduce the net warming impact of the persistent condensation trail.

* * * * *